July 9, 1968    J. H. KINDLESPARKER ETAL    3,392,221
METHOD FOR PRODUCING HOLLOW CERAMIC ARTICLES
Filed July 1, 1965    4 Sheets-Sheet 4

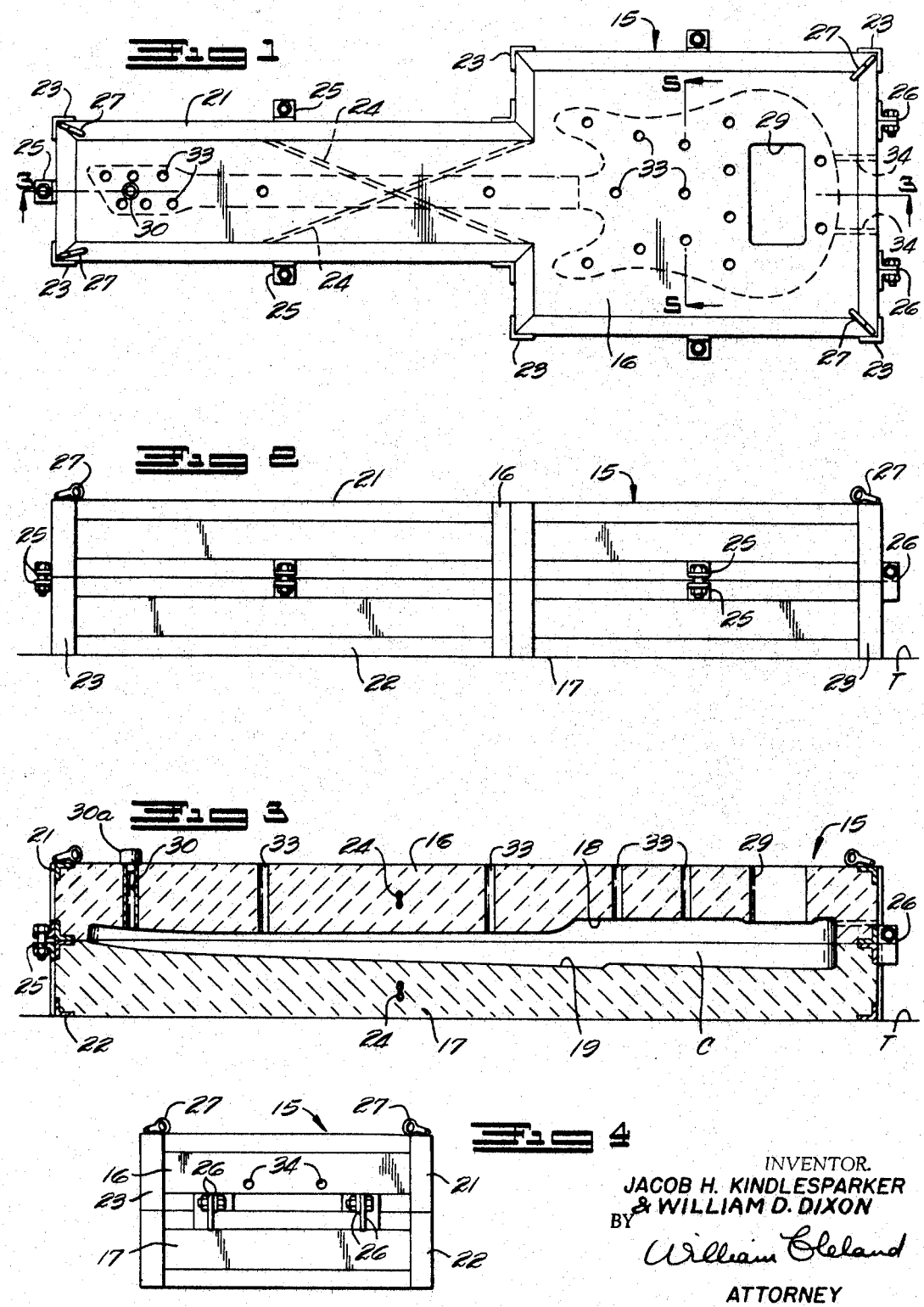

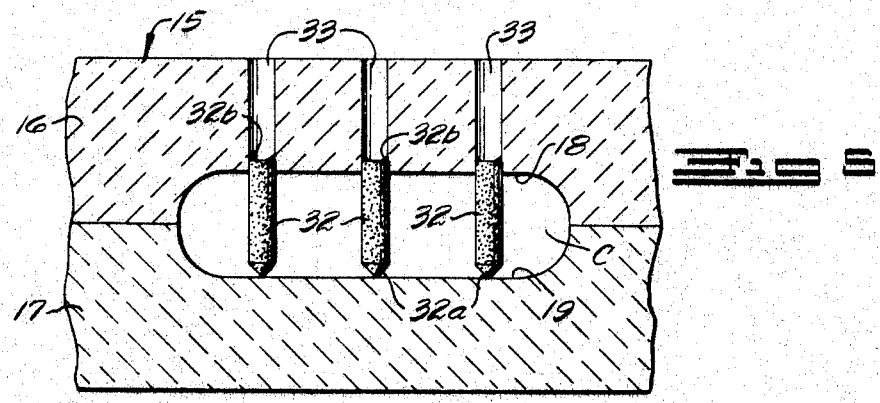
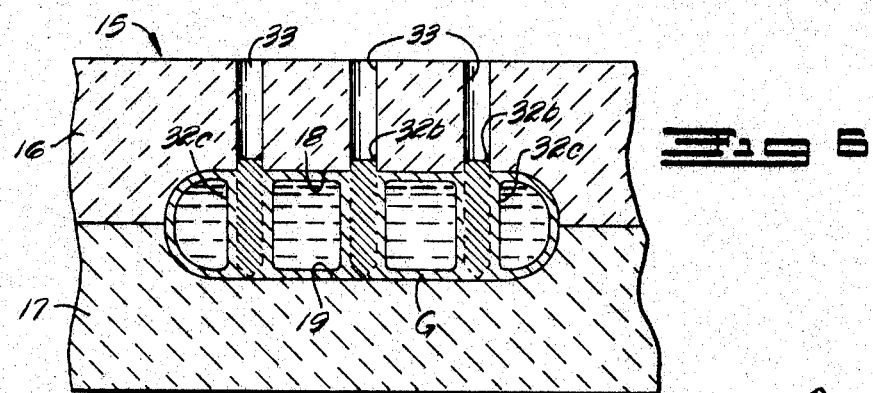
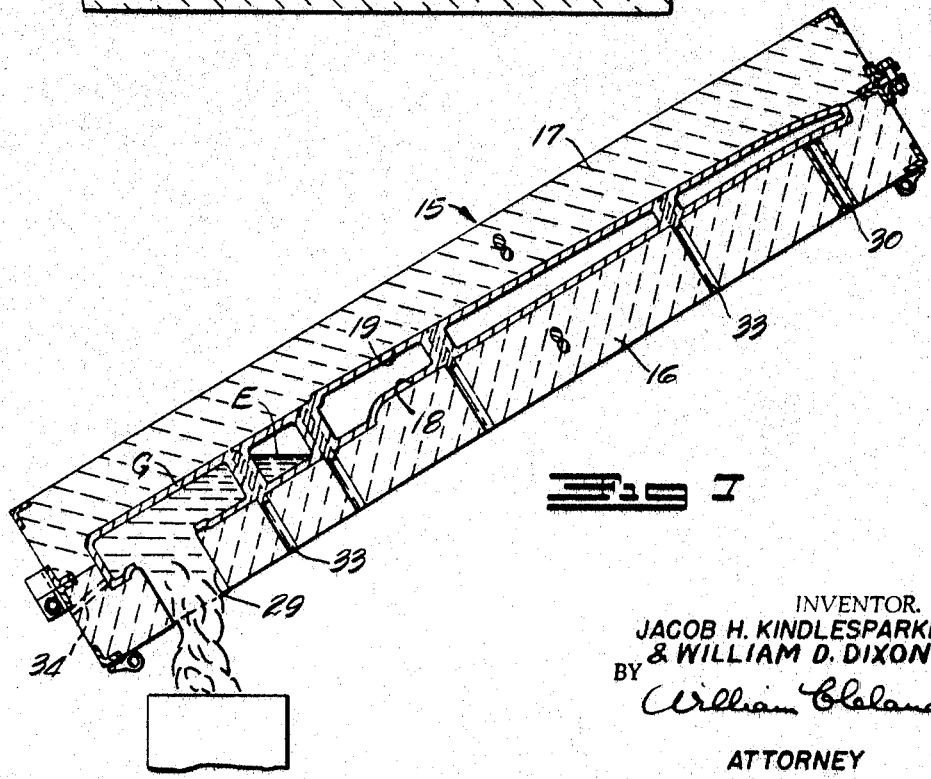

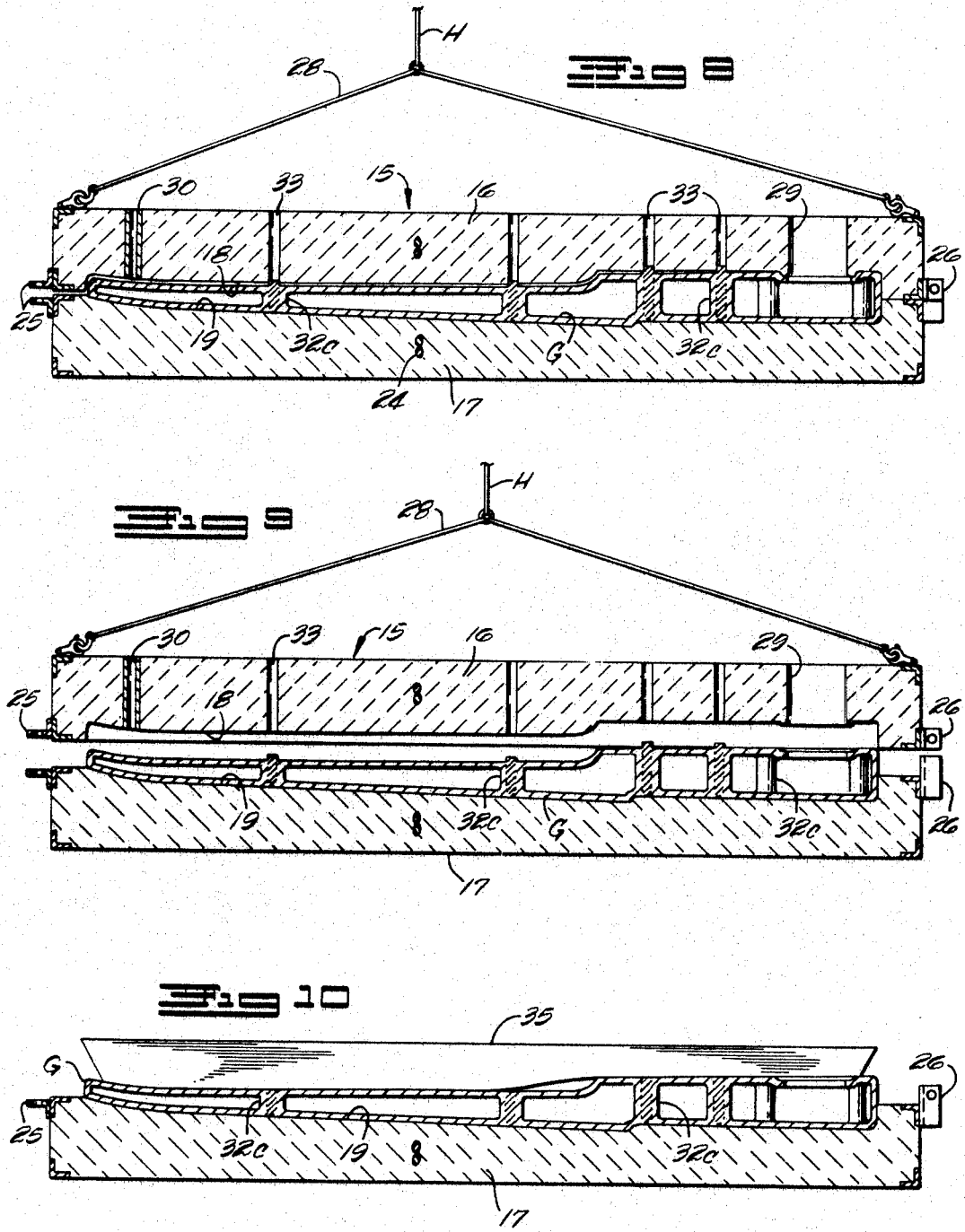

INVENTOR.
JACOB H. KINDLESPARKER
& WILLIAM D. DIXON
BY

ATTORNEY

United States Patent Office 3,392,221
Patented July 9, 1968

3,392,221
METHOD FOR PRODUCING HOLLOW CERAMIC ARTICLES
Jacob H. Kindlesparker, Stow, and William D. Dixon, Barberton, Ohio, assignors to Formold Corporation, Cleveland, Ohio, a corporation of Ohio
Filed July 1, 1965, Ser. No. 468,722
9 Claims. (Cl. 264—62)

This invention relates to a method and apparatus for making hollow articles and, in particular, relates to a method and apparatus for making rigid hollow articles by deposition of aqueous dispersions of ceramic material in porous molds.

In the past hollow casings for musical instruments, such as guitars, have been made, for example, by injection molding of separate sections secured together. Other methods involved even more intricate assembly of casing parts. In any event it is not known that anyone has ever made or produced one-piece, fired ceramic, guitar-type instrument casings prior to the present invention.

One object of the invetion is to provide an improved method for making substantially fully enclosed rigid, hollow articles by deposition of aqueous dispersion materials, such as ceramic slip, in which spaced enclosing walls of the molded article are prevented from collapsing during certain formative stages in the manufacturing procedure, which would otherwise obviate any possibility of molding or firing the hollow article without collapse of said walls.

Another object of the invention is to provide a new type of instrument casing, such as for a guitar, formed generally in one piece from ceramic material.

Another object of the invention is to provide an instrument casing as set forth in the preceding object, by which the instrument casing will have superior resonance and tonal qualities as compared with stringed instruments made from other materials in the past.

These and other objects of the invention will be manifest from the following brief description and the accompanying drawings.

Of the accompanying drawings:

FIGURE 1 is a top plan view of a porous mold, clamped in assembled condition for casting a one-piece, hollow ceramic casing for a guitar, in accordance with the method of the invention.

FIGURE 2 is a front elevation of FIGURE 1.

FIGURE 3 is a vertical cross-section, taken substantially on the line 3—3 of FIGURE 1.

FIGURE 4 is an end elevation as viewed from the right of FIGURE 1.

FIGURE 5 is an enlarged vertical cross-section, taken substantially on the line 5—5 of FIGURE 1, but illustrating a preliminary step in the method.

FIGURE 6 is a view corresponding to FIGURE 5, on the same scale, illustrating an article casting step of the method.

FIGURE 7 is a view corresponding to FIGURE 3, but with the clamped mold tilted and inverted for removal of excess article casting material.

FIGURE 8 is a longitudinal cross-section corresponding to FIGURE 3, but with the mold section unclamped for initial progressive release of the upper mold section from the formed article retained in the lower mold section.

FIGURE 9 is a view corresponding to FIGURE 8, wherein after replacing the top mold half, it is lifted away from the lower mold half in parallelism thereto.

FIGURE 10 is a view corresponding to FIGURE 9, showing a subsequent step of applying a preformed article-handling cradle to the upper side of the formed article in the lower mold section.

Figure 11:
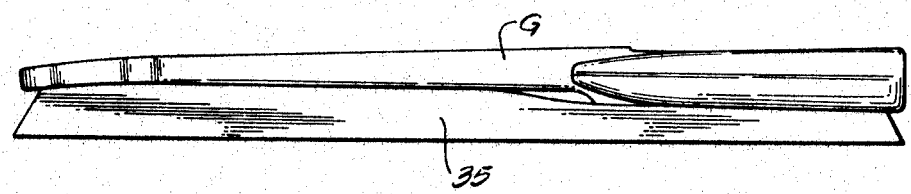
FIGURE 11 is a front elevation showing the formed article supported on said cradle, following a method step of inverting the assembly shown in FIGURE 10.
Figure 12:
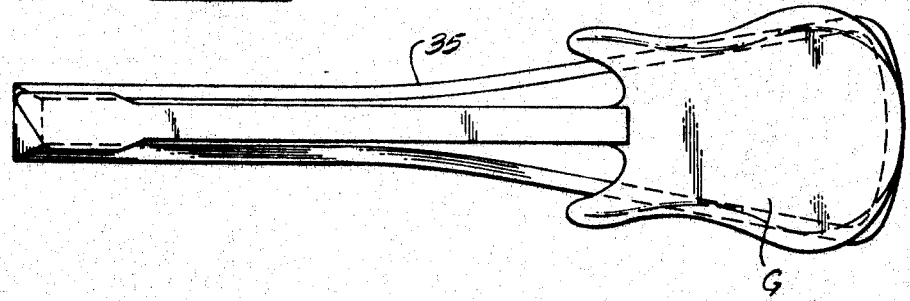
FIGURE 12 is a top plan view of FIGURE 11.
Figure 13:
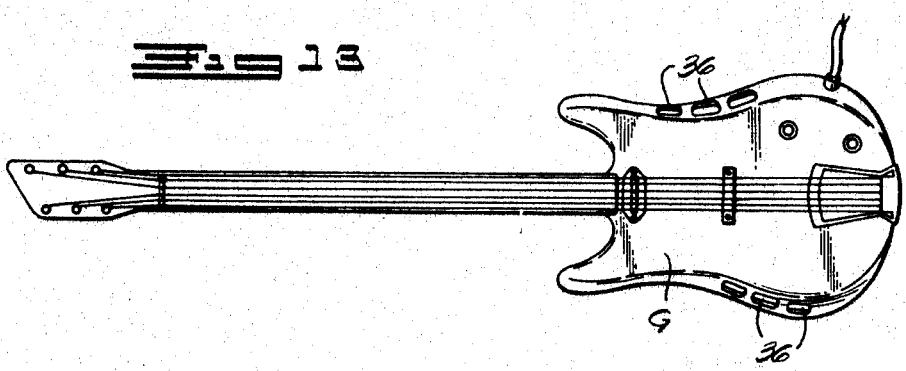
FIGURE 13 is a top plan view of the article, namely, a guitar, after finishing, painting, and kiln-firing steps, replete with fittings, strings, electronic attachments, etc.

The method steps of the invention will be best described in connection with use and operation of a porous plaster mold as illustrated in FIGURES 1 to 12 to produce a novel ceramic guitar C as illustrated in FIGURE 13.

As best shown in FIGURES 1 to 4, there is provided a sectional cavity mold 15 made of porous material, such as plaster of Paris, and including mating top and bottom mold sections 16 and 17, respectively, in which somewhat shallow, article-forming cavity portions 18 and 19 cooperate to define corresponding top and bottom wall portions of a guitar of the general type shown in FIGURE 13. Each mold section has built into the same a framework of angularly connecting angle irons, including vertically oppositely disposed frames 21 and 22, integrally formed in the general transverse shape of the mold 15, which in turn is of the same general shape of the guitar. The oppositely disposed frames 21 and 22 of each mold section 16 and 17 are integrally connected by angle irons 23, 23 at the various corners, and the sections may be further reinforced by truss rods 24, 24 embedded in the plaster of the respective mold halves in a manner which avoids the cavity portions 18 and 19 and working parts or mating surfaces of the mold. Mating lugs 25, 25 and 26, 26 are provided on frame portions of the mold sections for bolting or clamping the same together and pairs of eyelets 27, 27 may be provided at opposite end corners of top frame 21 of the top mold section for attachment of a lifting harness 28 in a manner to be described later. Other structural parts of the mold will be referred to in the description of the method.

In practicing the method of the invention the mold 15, with the top and bottom sections 16 and 17 clamped together, is supported on table or other fixture T so that a relatively large pouring or sprue hole 29 at the wide end of the cavity portion 18 is exposed upwardly, as shown in FIGURES 1 and 3. At the opposite narrow end of the cavity, a non-porous, metal tube 30 extends through the top mold wall, to the cavity surface as shown, for venting purposes to be described later. In other words, the mold is supported in a horizontal position in which the general plane of the mold cavity, designed for forming a relatively thin article of generally broad lateral area, will also extend horizontally, as shown in FIGURES 3 and 5.

Next, preformed cylindrical inserts 32, 32 of porous material, such as unfired ceramic slip, of hard consistency on the order of blackboard chalk, are inserted downwardly through holes 33, 33 of the same diameter provided at predeterminately spaced points in the plaster wall of the upper mold section 16, until pointed inner ends 32a of the inserts engage the cavity surface portion 19 of the lower mold section, in which position the lengths of the inserts 32 may be such that the upper ends thereof extend upwardly within the respective holes 33 only a slight distance, sufficient to retain the vertical positions of the inserts, as shown in FIGURE 5. A small amount of ceramic slip 32b may be deposited on the upper ends of the inserts 32, as by means of a syringe, for sealing against subsequent upward seepage of article-forming slip within the mold cavity such seepage would interfere with proper functioning of the inserts 32.

With the mold supported in horizontal or nearby horizontal positions, liquid slip is poured into the mold through the sprue opening 29 to fill the mold cavity C.

The sprue opening 29 is kept filled to assure that the cavity C is filled to capacity. A plug 30a in the outer end of the metal tube 30 insures that trapped air in the tube will prevent slip from clogging the tube. That is, the passage in the tube is kept free of slip. Several vent holes 34, 34 may be suitably located at the wide end of the mold cavity to prevent formation of air pockets which would cause defects in the article to be formed.

In any event, generally horizontal conditions of the mold are maintained for a sufficient length of time to allow a uniform thickness of liquid slip to deposit on the article-forming cavity surfaces 18 and 19, as shown in FIGURE 6, due to capillary movement of water outwardly through the mold pores. At the same time a like reinforcing thickness of slip forms about the inserts 32 to become integral therewith, and also integrally to unite with the opposite walls of the resultantly formed article G. The time required for this article-forming step may vary from approximately twenty minutes, more or less, depending upon the material used.

At the end of the article-forming step described, the closed mold is tilted upwardly at the narrow end to pour out the excess slip E, through the sprue opening 29, as shown in FIGURE 7, and then the mold is returned to horizontal position. Before the pouring step, however, the plug 30a is removed to obviate any tendency for pressurized trapped air in the tube to collapse portions of the article wall upon removal of the support of said excess slip. At this point the formed article walls are relatively soft and somewhat pliable but are retained tightly against the mold cavity surfaces by the hard inserts 32, while the article walls are further allowed to dry and stiffen by additional capillary action through the porous mold walls and the inserts 32, for about one hour, or as necessary to complete the capillary movement of water.

After this period the article walls, being of somewhat rubber-like flexible consistency, are amply supported against collapse or loss of molded shape by the integral rigid posts 32c so that with careful effort the molded article may be removed from the mold.

Accordingly, after releasing the clamping means at 25 and 26, and attaching a hoisting harness 28 to the eyelets 27, 27 at the top mold in an "off dead center" position, the hoisting cable H is raised progressively to tilt the top mold section 16 slightly toward the right, as viewed in FIGURE 8, thereby progressively to release the projecting upper ends of the inserts 32 from the respective holes 33 in the mold section 16, and without necessarily releasing the formed article from the lower mold section. Then the upper mold section is lowered back to mating position, and the harness 28 is reversed to position the hoisting cable H in the center of gravity position with respect to the mold. Upon again raising the hoisting cable H, the upper mold half may be removed vertically from the lower mold half in parallelism, as indicated in FIGURE 9, without disturbing the formed article or the projecting upper ends of the inserts 32.

Upon such removal of the upper mold half, the projecting ends of the wall-supporting inserts 32 may be removed by using a sharp cutting instrument and/or smoothed over, as shown in FIGURE 10, with the aid of water or slip.

At this point in the method, the consistency of the walls of the article still may be such that relatively wide expanses would tend to collapse were it not for the bracing support of the integral, reinforced posts 32c, and care in handling is still necessary. Accordingly, a narrow handling cradle 35 of heat-hardened ceramic slip is moved downwardly to complemental engagement of spaced seat portions of the cradle with correspondingly shaped portions on the formed article, as shown in FIGURE 10. Upon manually or otherwise inverting this assembly of lower mold half 17, formed article, and cradle 35, the mold half is removable so that the formed article G may be carried by means of the cradle to a kiln (not shown) where the article, while still supported on the cradle, may be fired for a requisite length of time to reach desired firing temperature (such as from 1800° to 2100° F.).

Before the last-named kiln-firing step, holes 36, 36 may be cut in the respective wall of the formed article, as for improving the resonance and/or decorativeness of the finished guitar. At this stage, other holes or recesses for screws and fittings may be provided.

After the formed article has cooled from the kiln-firing step, the outer and inner surfaces of the same may be spray-painted or otherwise coated with suitable coloring and glazing materials of the types used for ceramics, after which the painted article may again be kiln-fired.

Upon cooling, the finished kiln-fired article may be handled in the manner of any other delicate instrument casing, as for attachment of strings, keys, and various electronic amplifying units, as shown in FIGURE 13. The finished stringed instrument, due to the superior resonance qualities of kiln-fired ceramic materials, will have outstanding tone qualities, as compared with similar instruments made with other materials.

The molded article G produced by the method is best shown in FIGURES 9 and 13. Specifically, it is a one-piece, rigid, and seamless ceramic instrument casing, including a flat-bodied hollow sound box portion from which extends a long, hollow fretted neck, spaced walls of the body and the neck being supported by a plurality of posts which are integrally connected to the opposing said walls. The finished ceramic guitar is superior in a number of respects to guitars having casings of wood, or combinations of wood and other materials. In the first place, the one-piece ceramic casing is not affected by various temperatures and changes in humidity, and will not warp or otherwise alter shapes in the manner of prior art guitars, for example, in which it was generally necessary to provide means for frequent adjusting of the fretted necks with respect to the sound box portions. Moreover, in the present structure, a materially reduced absorption of sound vibrations by the ceramic casing walls results in quicker attainment of peak tone qualities produced by the strings, as well as appreciably longer retention of such peak tone qualities, whereby a richer sound is readily recognized and appreciated by listeners.

With use of the present method it is possible to make substantially flat, more or less completely enclosed hollow ceramic articles, other than guitars. The method is applicable to make decorative pottery pieces, for example, simulating musical instruments, which were not heretofore possible because there was no known way by which collapse of unsupported walls could be prevented.

Modifications of the invention may be resorted to without departing from the spirit thereof or the scope of the appended claims.

What is claimed is:

1. A method of making hollow articles, comprising the steps of providing a sectional porous mold having an article-forming cavity including spaced wall-forming surface portions and at least one aperture through a wall of the mold communicating with said cavity at one said surface portion; inserting a preformed insert of porous material through said at least one aperture to proximity with the opposite said surface portions; placing in said cavity a quantity of aqueous dispersion material capable of setting by removal of water therefrom and by capillary attraction of water through the mold pores and evaporation at the outer mold surface portions to deposit a thickness of the aqueous dispersion material constituting the wall of the article over the article-forming surfaces of the mold cavity, and also integrally uniting with opposite end portions of the at least one insert; and allowing the resultant formed article to set sufficiently for removal thereof from the mold with opposing walls of the article supported by said at least one insert.

2. A method of making hollow articles, comprising the steps of providing a sectional porous mold having an article-forming cavity including spaced wall-forming surface portions and at least one aperture through a wall of the mold communicating with said cavity at one said surface portion; inserting one or more preformed rigid inserts of porous ceramic material through said one or more apertures to proximity with the opposite said surface portion and with projections of the inserts within the respective apertures; placing in said cavity a quantity of aqueous dispersion ceramic material capable of setting by removal of water therefrom and by capillary attraction of water through the mold pores and evaporation at the outer mold surface portions thereby to deposit a thickness of the aqueous dispersion material constituting the wall of the article over the article-forming surfaces of the mold cavity, and also depositing a coating of the aqueous dispersion material integrally about the porous inserts to unite opposite end portions of the stems with the opposite said spaced wall-forming surface portions; and allowing the resultant formed article to set sufficiently for removal thereof from the mold with opposing walls of the article supported by said one or more coated inserts.

3. A method as in claim 2, including the step of fluid-sealing said projections of the one or more inserts within said apertures therefor with frangible material, to permit break-away removal of projections from the aperture walls upon opening said mold.

4. A method as in claim 3, including the step of removing said projections from the outer molded surface of the formed article.

5. A method as in claim 4, including the step of firing the formed article in open heat.

6. A method as in claim 5, including the steps of coating the formed article with decorative coloring material, and firing the coated article in open heat.

7. A method as in claim 2, including the step of firing the formed ceramic article in open heat.

8. A method as in claim 2, including the steps of firing the formed ceramic article in open heat, allowing the fired article to cool, coating the fired article with decorative coloring material, and firing the coated article in open heat.

9. A method of making hollow articles, comprising the steps of providing a sectional porous mold having an article-forming cavity including spaced wall-forming surface portions and at least one aperture through a wall of the mold communicating with said cavity at one said surface portion; inserting one or more preformed inserts of porous ceramic material through said one or more apertures to proximity with the opposite said surface portion; pouring through a sprue opening in a top wall of the mold and aqueous dispersion ceramic material until the mold cavity is filled, allowing the dispersion material to set by removal of water therefrom and by capillary attraction of the water outwardly through the mold pores and evaporation at the outer mold surface portions to deposit a thickness of the aqueous dispersion material constituting the wall of the article over the article-forming surfaces of the mold cavity, and also integrally uniting with opposite end portions of said one or more inserts; and allowing the resultant formed article to set sufficiently for removal thereof from the mold with opposing walls of the article supported by said one or more inserts.

References Cited
UNITED STATES PATENTS 2,070,672 2/1937 Moczala _____ 264—60 X
3,163,688 12/1964 Lindenthal _____ 264—56

FOREIGN PATENTS 654,480 12/1962 Canada.

ROBERT F. WHITE, *Primary Examiner.*

K. J. HOVET, *Assistant Examiner.*